June 1, 1937.  S. D. MURPHY ET AL  2,082,415

COMPOSITE STRUCTURE

Filed July 30, 1935

Inventors
SHIRLEY D. MURPHY.
FRANK V. OSBORN,
Attorneys,

Patented June 1, 1937

2,082,415

UNITED STATES PATENT OFFICE 2,082,415

COMPOSITE STRUCTURE

Shirley D. Murphy and Frank V. Osborn,
Indianapolis, Ind.

Application July 30, 1935, Serial No. 33,860

3 Claims. (Cl. 20—74)

Our invention relates to a composite structure, and, in particular, to a structure having a support of relatively cheap material, such as cold rolled steel, and a decorative structure consisting of a combination of stainless steel and a plastic material.

It is the object of the invention to provide decorative mouldings or panels having alternative areas of plastic materials of various colors and stainless steel borders adapted to retain the plastic material in position and to furnish the necessary contrasting decorative effect; and, at the same time, to provide a structural support of adequate strength and of cheaper materials so as to provide the necessary rigidity for the composite stainless steel and plastic materials, while presenting to the observer a non-corrosive decorative material.

If the stainless steel is made heavy enough to be utilized as a support, the expense of the material is prohibitive. If it is used only as a decorative material there is no contrasting colors and designs which can be satisfactorily formed.

It is the object of our invention to provide a rigidly-supported composite structure of plastic material retained in position by the stainless steel, or the plastic material may be used as a binder for binding and decorating the stainless steel thus supported by a rigid support.

Referring to the drawing.

Figure 1:
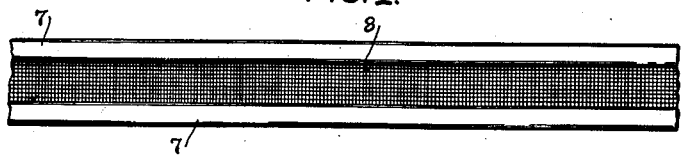
Figure 1 is a top plan view of a strip of plastic material, such as celluloid, bordered and retained by an enclosing body of stainless steel, the back of which has welded to the stainless steel a rigid support of cold rolled steel.
Figure 2:
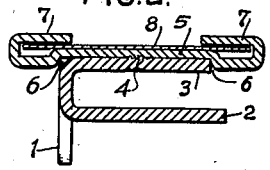
Figure 2 is an end elevation of the structure shown in Figure 1.
Figure 3:
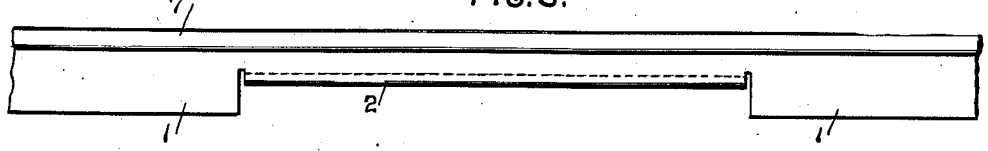
Figure 3 is an elevation of one side of the structure.
Figure 4:
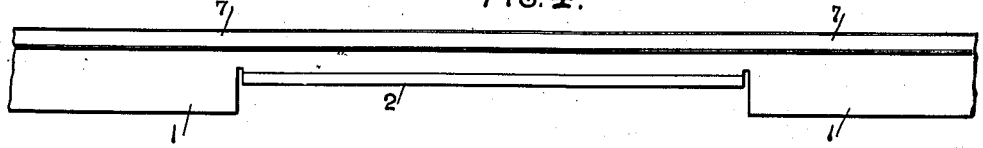
Figure 4 is an elevation of the other side of the structure.
Figure 5:
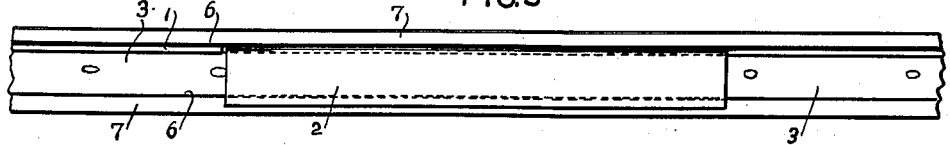
Figure 5 is a rear elevation of the structure shown in Figure 1.

When referring to such materials as "stainless steel", "celluloid" and "cold rolled steel", it will be understood that we are referring to these materials generically by way of illustration, and do not desire to confine ourselves to these particular materials but only to those of the same general characteristics, advantages and disadvantages.

Referring to the drawing in detail, 1 designates the vertical portion of a cold rolled steel support having an attaching flange 2. Formed integral with this cold rolled steel support is a horizontally-disposed portion extending at right angles to the portion 1 and designated 3. This has an attaching face, upon which is spot welded as at 4 the stainless steel plate 5. This plate is provided with shoulders 6 on either side of the plate 3 to maintain the stainless steel plate in alignment with its support. The edges of this stainless steel plate 5 are turned over as at 7. The space between these turned over edges is filled with a strip of "celluloid" 8, which may be of any desired color and thickness. This results in a composite structure being provided in which different colors may be inserted between the overlapping margins of the retaining stainless steel body.

Figure 6:
Figure 6 is a plan view of a modified form in which a stainless steel plate is engaged by an enclosure of celluloid.
Figure 7:
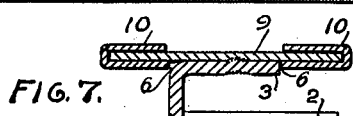
Figure 7 is an end elevation thereof.
Figure 9:
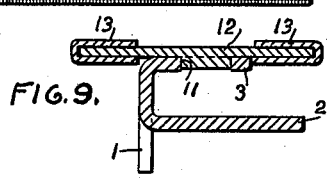
Figure 9 is an end elevation thereof.

Referring to the modified form shown in Figures 6 and 7, in this form a stainless steel plate 9 is welded to the horizontal portion 3 of the support 1. It is bordered on either side by overlapping, edge-engaging flanges of "celluloid" 10.

Figure 8:
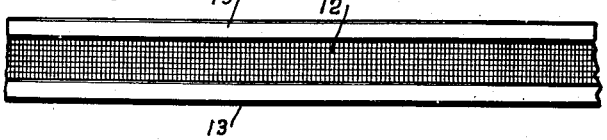
Figure 8 is a plan view of a modified form in which a celluloid plate is bordered by engaging stainless steel strips and the cold rolled steel support is directly attached to the back of the celluloid plate.

Referring to the form shown in Figures 7 and 8, the support 3 is provided with perforations 11, through which portions of the "celluloid" plate 12 are extruded under heat and pressure to attach the "celluloid" plate to the support. Stainless steel, edge-engaging strips 13 are employed to add the necessary decorative effect.

It will be understood that we desire to comprehend within our invention such modifications as may be necessary to adapt it to varying conditions and uses.

Having thus fully described our invention, what we claim as new and desire to secure by Letters Patent, is:

1. In combination, an angular support, a plate having struck-up shoulders mounted on one face of said support, the inner portions of said shoulders engaging with the edges of the face of the support, turned over edges on said plate, and a decorative strip inserted on the face of said plate with its edges beneath the turned over edges of the plate and clampingly engaged between the struck up shoulders and the turned over edges of the plate.

2. A new article of manufacture for use as a composite ornamental moulding comprising a relatively strong support of base metal, a relatively thin rustless metal plate rigidly attached thereto, having a struck up central portion terminating at each side in a shoulder and having its side edge portions beyond the shoulders turned over, and a strip of plastic material supported on said metal plate and clampingly secured between the struck up central portion and said turned over edges of said metal plate.

3. A new article of manufacture for use as a composite ornamental moulding comprising a relatively strong support of cold rolled steel, a relatively thin rustless metal plate spot welded thereto, said plate having a struck up central portion terminating at each side in a shoulder and having its side edge portions beyond the shoulders turned over, and a strip of plastic material on said metal plate having its central portion supported by the struck up central portion of said plate, and having its side edge portions disposed beneath the turned over edge portions of said plate whereby relative longitudinal movement between said strip and said plate is frictionally resisted.

SHIRLEY D. MURPHY.
FRANK V. OSBORN.